US008572112B2

(12) United States Patent
Williams et al.

(10) Patent No.: US 8,572,112 B2
(45) Date of Patent: Oct. 29, 2013

(54) SYNDICATING SEARCH QUERIES USING WEB ADVERTISING

(75) Inventors: Hugh Evan Williams, Redmond, WA (US); Kenneth Alan Moss, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 12/165,089

(22) Filed: Jun. 30, 2008

(65) Prior Publication Data

US 2009/0119259 A1 May 7, 2009

Related U.S. Application Data

(60) Provisional application No. 60/984,986, filed on Nov. 2, 2007.

(51) Int. Cl.
*G06F 17/30* (2006.01)

(52) U.S. Cl.
USPC ........................................................ 707/768

(58) Field of Classification Search
USPC ........................................................... 705/14
See application file for complete search history.

(56) References Cited

U.S. PATENT DOCUMENTS

| 6,615,207 | B1 | 9/2003 | Lawrence |
| 7,191,147 | B2* | 3/2007 | Heene et al. ..................... 705/14 |
| 7,359,893 | B2* | 4/2008 | Sadri et al. ........................... 1/1 |
| 7,640,512 | B1* | 12/2009 | Appling ........................ 715/771 |

| 2005/0021397 | A1* | 1/2005 | Cui et al. ........................ 705/14 |
| 2005/0108216 | A1 | 5/2005 | Schramm-Apple et al. |
| 2005/0203878 | A1 | 9/2005 | Brill et al. |
| 2006/0004708 | A1 | 1/2006 | Hartmann et al. |
| 2006/0074845 | A1 | 4/2006 | Grossmann |
| 2006/0271884 | A1 | 11/2006 | Hurst |
| 2006/0288000 | A1 | 12/2006 | Gupta |
| 2007/0005571 | A1 | 1/2007 | Brewer et al. |
| 2007/0016559 | A1* | 1/2007 | Kraft ................................ 707/3 |
| 2007/0060099 | A1* | 3/2007 | Ramer et al. .................. 455/405 |

(Continued)

FOREIGN PATENT DOCUMENTS

| WO | 2004079522 A3 | 9/2004 |
| WO | 2006137993 A2 | 12/2006 |

OTHER PUBLICATIONS

"Introducing Yahoo! Smart Ads"; http://advertising.yahoo.com/central/marketing/smartads.html.

(Continued)

*Primary Examiner* — Neveen Abel Jalil
*Assistant Examiner* — Kellye Buckingham
(74) *Attorney, Agent, or Firm* — Shook Hardy & Bacon LLP (57) ABSTRACT

Displaying potential search-engine queries in a portion (e.g., a portion allocated for a web advertisement or within an inline frame) of a web page along with the content of the web page is described herein. The potential search-engine queries are determine by first analyzing either the underlying content of the web page (or other web pages) or searching various historic user metrics. Once determined, the potential search-engine queries are displayed within the portion of the web page along with the content of the web page. When a user selects one of the displayed potential search-engine queries, a query is sent to a search engine requesting web content relevant to the selected potential search-engine query.

14 Claims, 4 Drawing Sheets

(56) References Cited

U.S. PATENT DOCUMENTS

| | | |
|---|---|---|
| 2007/0100867 A1 | 5/2007 | Celik et al. |
| 2007/0156654 A1* | 7/2007 | Ravinarayanan ............. 707/3 |
| 2007/0174269 A1 | 7/2007 | Jing et al. |
| 2007/0203903 A1 | 8/2007 | Attaran Rezaei et al. |
| 2007/0208706 A1 | 9/2007 | Madhavan et al. |
| 2008/0306972 A1* | 12/2008 | Wilkin et al. ............. 707/100 |
| 2009/0006375 A1* | 1/2009 | Lax et al. ............. 707/5 |

OTHER PUBLICATIONS

"Open-SmartAds"; http://www.opendnn.net/DNNModules/OpenSmartAds/tabid/106/Default.aspx.

"More Information on SmartAd"; http://am.net/ad/moreinfo.htm.

International Search Report and Written Opinion of PCT/US2008/080480 mailed Feb. 27, 2009.

\* cited by examiner

SYNDICATING SEARCH QUERIES USING WEB ADVERTISING

CROSS REFERENCE TO RELATED APPLICATIONS

The present application claims priority to the provisional application assigned U.S. Patent Ser. 60/984,986 Nov. 2, 2007 and entitled SYNDICATING SEARCH QUERIES USING WEB ADVERTISING.

BACKGROUND

As the Internet becomes increasingly popular, search engines are becoming more competitive in an effort to gain a share in the web-search market. Typically, a search engine makes money from advertising. Users enjoy the ability to easily search and locate web content, and advertisers can strategically place advertisements—e.g., a sponsored search result, banner ad, etc. Increasing web traffic to the search engine benefits advertisers by providing exposure to their advertisements. The more traffic a search engine can attract, the more valuable their advertising space becomes.

Many search engines draw attention to specific terms in a web page using specific tags, called "SmartTags." For example, suppose a document on the web describes a company's recent financial performance. Key terms in the document, such as the company's name, stock symbol, or products could be highlighted using a visual clue (e.g., a squiggly underline). When the user clicks on the highlighted terms, conventional search engines typically issue a search query and the results therefrom are displayed in a pop-up window. Or the user may alternatively be redirected to a regular search-results page. Only words or phrases that appear in a web document are candidates for SmartTags, thus limiting the words to be highlighted to the words contained on the web page.

Similarly, many traditional search engines provide query suggestions (commonly referred to as "related searches") in order to suggest keywords that may yield more precise search results to users. For instance, the user searching for the "cats" may be presented with related search terms, such as "tabby cats," "dogs," or "cat care." Often, such suggestions are presented as hyperlinks, which, when selected, drive a new query to the search engine. Additionally, suggestions may appear in image searches, video searches, or on a No Results page.

SUMMARY

One aspect of the present invention is directed to presenting a requested web page to a user along with one or more potential search-engine queries related to the content of the requested web page. A determination is made whether a portion of the web page is allocated for content other than the web page (e.g., an advertisement). The content of the web page is determined, and, based on the content, potential search-engine queries are located. These potential search-engine queries are presented in the allocated portion of the web page.

Another aspect of the present invention is directed to determining the potential search-engine queries based on the content of a web page and/or various historic user metrics. The content may be ascertained using SmarTags, metadata, or other semantic analysis tools for web content. Historic user metrics include, for example but without limitation, historical user keywords, traffic information, user-profile data, toolbar information, or similar data.

Another aspect of the present invention is directed to a graphical user interface (GUI) for displaying a web page along with a web-advertisement portion populated with one or more potential search-engine queries. When the user selects one of the potential search-engine queries, a request is made to a search engine for web content relevant to the selected potential search-engine query.

BRIEF DESCRIPTION OF THE SEVERAL VIEWS OF THE DRAWINGS

The present invention is described in detail below with reference to the attached drawing figures, wherein.

DETAILED DESCRIPTION

The subject matter described herein is presented with specificity to meet statutory requirements. The description herein, however, is not intended to limit the scope of this patent. Rather, it is contemplated that the claimed subject matter might also be embodied in other ways, include different steps or combinations of steps similar to the ones described in this document, or be integrated with other present or future technologies. Although the term "block" may be used herein to connote different elements of methods employed, the term should not be interpreted as implying any particular order among or between various steps disclosed herein.

Embodiments described herein generally related to using web advertising space to show search queries that are related to the content of the web page hosting the advertisement. The queries can then be selected by a user, resulting in the user being redirected to a search results page. Queries may be shown as text, multimedia (such as montages of images or video), news, graphs, maps, or any other content type. Results can be web search results, image search results, video search results, news search results, map search results, or any other content.

According to embodiments of the present invention, a user is presented with a rendered web page along with potential search-engine queries related to the underlying content of the rendered web page. In one embodiment, a web page is presented in a web browser, and a portion of the web page designated for a web advertisement is populated with the potential search-engine queries. A user viewing the web page can select any of the potential search-engine queries, which, upon selection, initiates a search-engine query for the selected web content. For example, a web article about cancer may be displayed in a web-browser window along with a banner advertisement portion that includes various hyperlinks related to cancer. The user can then simply select one of the hyperlinks, effectively initiating a submission of a query to a search engine.

For the sake of clarity, embodiments are described herein as displaying the potential search-engine queries in a portion of a web page allocated to a web advertisement (e.g., a banner advertisement, pop-up advertisement, etc.). But embodiments are not limited to displaying the potential search-engine queries in an advertisement. Rather, the potential search-engine queries can be presented in any portion of a web page. One skilled in the art will appreciate that many methods currently exist for displaying information simultaneously with a web page—for example, an inline frame (iFrame) may be initiated.

In one embodiment, potential search-engine queries are contextually relevant, meaning they depend on the content of the web page they will be displayed with or they depend on various metrics related to user behavior. The metrics may include, for example but without limitation, user preferences, historical user keywords, geographic location, time, user-profile data, click logs, SmarTags, parameters associated with electronic commerce (e-commerce), as well as various other tracked parameters. Additionally, potential search-engine queries, as described herein, refer to interactive keywords, hyperlinks, images, video, or audio queries may be presented to a user, such that when a potential search-engine query is selected, a request is made to a search engine for web content.

A distinction should be made between "content" and "web content," as described herein. Content refers to the underlying meaning of a web page. For example, the content of a web page describing "travel deals across the country" could be "traveling." Whereas, web content refers to resources on the Web, such as, for example but without limitation, web pages, portions of text in web pages, images, audio, videos, or other information published on the Web or in a networked environment.

One embodiment of the present invention is directed to one or more tangible computer-readable media having computer-executable instructions embodied thereon for performing steps to present to a user one or more potential search-engine queries related to the content of a requested web page along with the requested web page to a user. A determination is made whether a portion of the web page is allocated for some web content other than the content of the web page (e.g., a web advertisement). The content of the web page is determined, and, based on the content, potential search-engine queries are located. These potential search-engine queries are presented in the allocated portion of the web page.

Another embodiment of the present invention is directed to determining the potential search-engine queries based on the content of a web page and/or various historic user metrics. The content may be ascertained using SmarTags, metadata, or other semantic-analysis tools. Historic user metrics includes, for example but without limitation, historical user keywords, traffic information, user-profile data, toolbar information, or similar data.

Another embodiment of the present invention is directed to a graphical user interface (GUI) for displaying a web page along with a web-advertisement portion populated with one or more potential search-engine queries. When the user selects one of the potential search-engine queries, a request is made to a search engine for web content relevant to the selected potential search-engine query.

Figure 1:
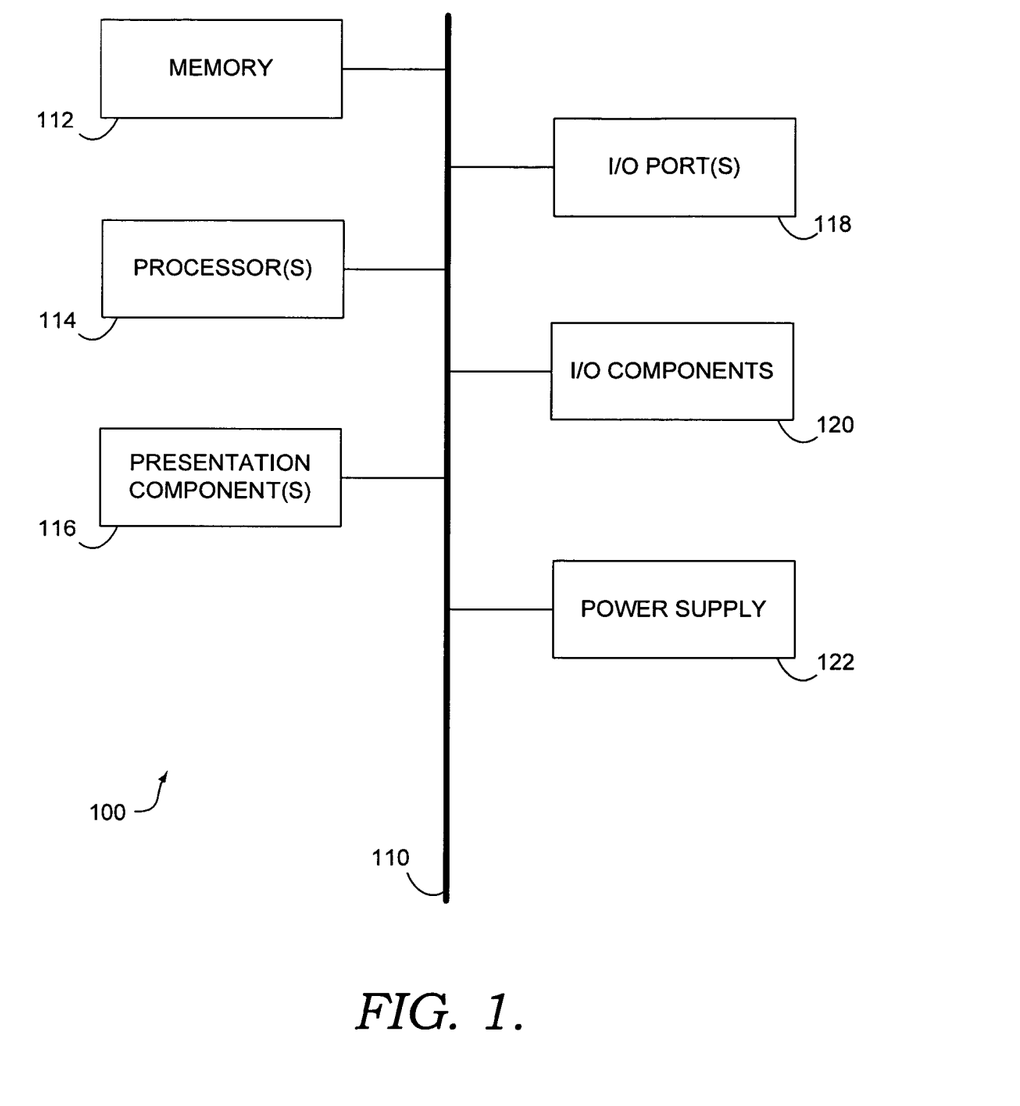
FIG. 1 is a block diagram illustrating components of a system for use in accordance with an embodiment of the present invention.

Having briefly described a general overview of the embodiments described herein, an exemplary operating environment is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, smartphone, digital phone, handheld device, BlackBerry®, personal digital assistant (PDA), or other device capable of executing computer instructions.

The invention may be described in the general context of computer code or machine-useable instructions, including computer-executable instructions such as program modules, being executed by a computer or other machine, such as a PDA or other handheld device. Generally, program modules including routines, programs, objects, components, data structures, and the like refer to code that perform particular tasks or implement particular abstract data types. Embodiments described herein may be practiced in a variety of system configurations, including hand-held devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
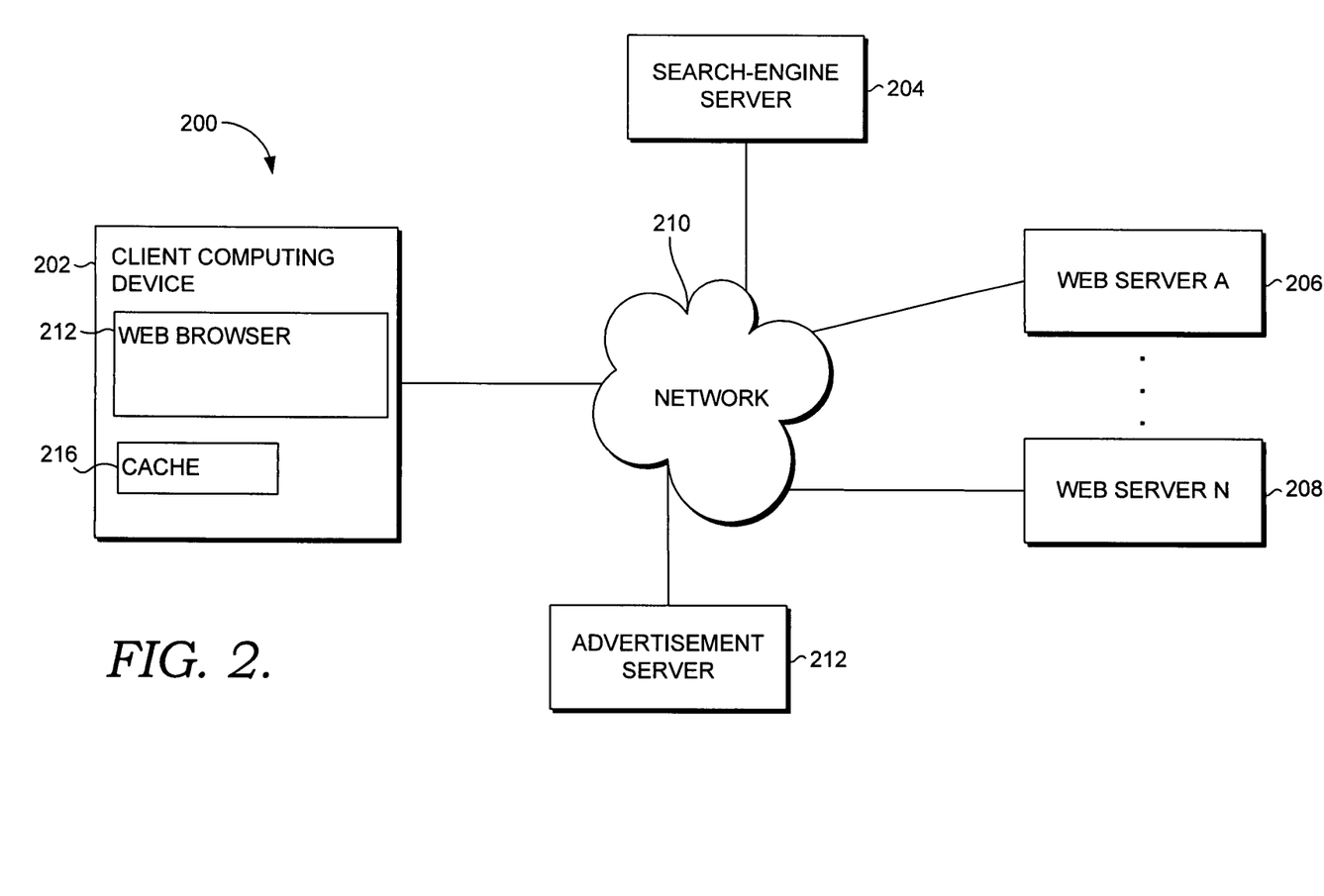
FIG. 2 is a block diagram of a networked computer system in accordance with an embodiment of the present invention.

Turning now to FIG. 2, a block diagram depicting a networking architecture 200 is shown for use in implementing an embodiment of the present invention. The networking architecture 200 comprises a client computing device 202, search-engine server 204, one or more web servers (indicated as a web server A 206 and a web server N 208), and an advertisement server 212 all of which communicate via network 210. The dots between the web server A 206 and the web server N 208 indicate that, in some embodiments, the number of web servers is scalable and may include any number of web servers accessible over the network 210. One skilled in the art will appreciate this concept, because web pages are typically hosted on different web servers, and different portions of a single web page may, in actuality, be hosted on different servers. Networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

Network 210 may include any computer network or combination thereof. Examples of computer networks configurable to operate as network 210 include, without limitation, a wireless network, landline, cable line, fiber-optic line, local area network (LAN), wide area network (WAN), metropolitan area network (MAN), or the like. Network 210 is not limited, however, to connections coupling separate computer units. Rather, network 210 may also comprise subsystems that transfer data between servers or computing devices. For example, network 210 may also include a point-to-point connection, the Internet, an Ethernet, a backplane bus, an electrical bus, a neural network, or other internal system.

In an embodiment where network 210 comprises a LAN networking environment, components are connected to the LAN through a network interface or adapter. In an embodiment where network 210 comprises a WAN networking environment, components use a modem, or other means for establishing communications over the WAN, to communicate. In embodiments where network 210 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

The search-engine server 204, the web server A 206, the web server N 208, and the advertisement server 212 may include any type of application server, database server, or file server configurable to perform the methods described herein. In addition, each of the search-engine server 204, the web server A 206, the web server N 208, and the advertisement server 212 may be a dedicated or shared server. One example, without limitation, of a server that is configurable to operate as the search-engine server 204, web server A 206, web server N 208, and advertisement server 212 is a structured query language ("SQL") server executing server software such as SQL Server 2005, which was developed by the Microsoft® Corporation headquartered in Redmond, Wash. The servers described herein may also be configured to run various operating systems well known to those of skill in the art, including, for example, the Microsoft Windows®, MaOS™, BeOS™, Mach, Apache, OpenStep™, or another operating system or platform. In an embodiment, two or more of the servers may be directly or indirectly connected to each other without using network 210.

Components of the search-engine server 204, the web server A 206, the web server N 208, and the advertisement server 212 may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via network 210. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

While the search-engine server 204 and the advertisement server 212 are illustrated as single boxes, one skilled in the art will appreciate that the search-engine server 204 and the advertisement server 212 are, in some embodiments, scalable. For example, the search-engine server 204 may in actuality include 100 servers in communication. The single unit depictions are meant for clarity, not to limit the scope of embodiments in any form.

In operation, the search-engine server 204 hosts a search engine designed to receive queries from remote computing devices (such as the client computing device 202) and locate information on the Web or within a private network to satisfy the queries. A query may consist of a request for information on the Web or private network that contains specific keywords or phrases. In addition, a query may include user-specified indications to only search particular types of web resources. In some embodiments, the search engine executing on the search-engine server 204 uses regularly updated indexes, which are created by web crawlers, to quickly locate web pages satisfying a query. Once the web pages are located, their URIs are transmitted back to the client computing device 202 and displayed as hyperlinks thereon. To access a located web page, a use need only select the corresponding hyperlink. One skilled in the art will appreciate that various other techniques exist for mining information on the Web or a private network.

Web pages are stored on the various web servers (e.g., the web servers A 206 and N 208) and accessible via the network 210 using a transfer protocol and relevant URI. The client computing device 202 may fetch a web page by requesting the URI using the transfer protocol. As a result, the web page can be transmitted to the client computing device 202 and stored in memory. The stored web page can then be read by the web browser 212 and presented to a user.

The client computing device 202 may be any type of computing device, such as device 100 described above with reference to FIG. 1. By way of example only but not limitation, the client computing device 202 may be a personal computer, desktop computer, laptop computer, handheld device, cellular phone, digital phone, smartphone, PDA, or the like. But it should be noted that embodiments are not limited to implementations on such computing devices.

The client computing device 202 comprises a web browser 212. The web browser 212 is a software application enabling a user to display and interact with information located on the Web. In an embodiment, the web browser 212 communicates with the search-engine server 204, the web server A 206, and the web server N 208, using a transfer protocol to fetch web pages. Web pages may be located by the web browser 212 by requesting the URI using the transfer protocol. The web browser 212 may use other URI types and protocols, such as file transfer protocol (FTP), real-time streaming protocol (RTSP), etc. The web browser 212 can also execute a number of markup languages (e.g., hypertext markup language (HTML) and extensible markup language (XML)) as well as scripting languages (e.g., JavaScript or Visual Basic Scripting Edition (VBScript)).

The advertisement server 212, in one embodiment, is configured to receive and fulfill requests for advertisements. Those skilled in the art will appreciate that numerous software-implemented rules can be applied by the advertisement server 212 to select stored advertisements for presentation with a web page. For example, the advertisement server 212 may select a banner advertisement on a retrieved web page based on specific parameters, such as, the geographic location associated with the internet protocol (IP) address of the client computing device 202. One skilled in the art will appreciate that numerous other parameters may be used to designate advertisements—such as, for example, the content of a web page, the price an advertiser has paid, an auction price associated with multiple advertisements, of other well-known parameters to those of skill in the art.

In one embodiment, the advertisement server 212 is configured to retrieve potential search-engine queries relevant to a web page. The potential search-engine queries will be displayed, in one embodiment, in a portion of the web page designated for an advertisement—for example, a banner advertisement, side-bar advertisement, or the like. For example, if the user requests a web page about traveling deals, an advertisement portion may be syndicated with hyperlinks of phrases about popular travel destinations, pictures of popular traveling locations, icons of popular traveling songs, or videos related to traveling. Then, when the user selects any of the hyperlinks or multimedia, a request is sent to the search-engine server 204 requesting web content relevant to the selected hyperlink or multimedia.

The advertisement server 212 may retrieve potential search-engine queries and web content for inclusion in the advertisement portion of the web page in any number of ways. In one embodiment, when a request for a web page is sent to the web server A 206 or N 208, the web server A 206 or N 208 communicates with the advertisement server 212 to determine whether the advertisement server 212 has an advertisement to display on the web page. This may be dictated by an advertisement exchange program, which is an agreement between multiple web pages or the advertisement server 212 to present advertisements on the web page. In this embodiment, if either no advertisement is to be displayed or the search engine on the search-engine server 204 is entitled to advertising space on the web page, the content of the web page is parsed for underlying descriptive information. Such information may include, for example, SmartTags, definitions, or various other metadata that can be used to determine the content of the web page. One skilled in the art will appreciate that numerous methods are generally well known for ascertaining the content of the web page. For instance, the text on a web page may be checked and the content determined based on the frequency of particular words being used—such as, using "travel" often on traveling web pages. Also, titles, consecutive capitalized words, headings, hyperlinks, or bolded words may be given specific deference over other words.

In another embodiment, SmarTags are kept in a table on a database (not shown in FIG. 2 for clarity), and the web server A 206, the web server N 208, or the advertisement server 212 may be configured to retrieve the SmartTags associated with a particular web page. For example, if the table includes frequent references to "breast cancer," breast cancer may be added as a potential search-engine query for display in the advertisement portion of the web page.

Furthermore, the use of SmarTags may be filtered based on various degrees of sophistication. The advertisement server 212 may query for various user-specific parameters stored by the search-engine server 204. One skilled in the art will understand that modern search engines are capable of monitoring user selections (commonly referred to as "click logs") of web pages, which are typically stored as logs of user interaction. These logs may be consulted by the advertisement server 212 to determine what web pages users have historically selected when visiting the web page. In one embodiment, the SmarTags, or other underlying data specific to the historically selected web pages is used to suggest potential search-engine queries.

For example, if users visiting a traveling web page have historically selected web pages about San Francisco, San Francisco can included as potential search-engine query. In another example, if users historically visit a web page with tips for financing a vacation after viewing the traveling web page, a link may be presented with the keywords "Financing Vacation." In both situations, the underlying content of the historically visited web pages was checked to determine what potential search-engine query to include in the advertisement portion of the web page requested by a user on the client-computing device 202.

In still another embodiment, information from the toolbar of an instance of the web browser 212 may be parsed or reviewed to determine potential search-engine queries. For example, the URI of a web page may be parsed by the advertisement server 212 of the web servers A 206 and N 208 to determine the web page's underlying content. Suppose a user is viewing an online article about a crash in a racing event with the URI http://www.newspaper.com/sports/racecar/big-crash.html. The web server A 206, in one embodiment, is configured to parse the URI to determine that the user is viewing information about a racing accident. Typically, such information is saved in a database (not shown for clarity) in logs of URIs visited by users. These logs (click logs) may be consulted by the web server A 206 or N 208 or the advertisement server 212 to determine what pages users are viewing, and in what order they are historically viewing them. Such information can be used to determine the underlying content of the web pages users have historically navigated to after viewing a particular web page.

Additionally, toolbar information may include historical keywords submitted by users on a particular web page into a search-engine toolbar—e.g., the Windows® Live toolbar developed by the Microsoft® Corporation®, headquartered in Redmond, Wash. The search engine supporting the search-engine toolbar may track and manage logs of information detailing the historical keywords entered at particular web pages. These keywords may be searched by the search-engine server 204, in one embodiment, to locate the most frequently entered keywords. Frequency is not the only parameter that may be used, however, as the search-engine server 204 may be configured to query the logs based on other parameters (e.g., geographic location, internet protocol (IP) address, time, etc.), all of which are well known to those skilled in the art.

User profiles may also be used to determine what potential search-engine queries to display in the advertisement portion of the web page. Cookies may be used to determine what a particular user is selecting or viewing over time. User behavior during online shopping may also be tracked—for example, metrics typical to ecommerce (such as, purchased items, viewed items, etc.). One skilled in the art will appreciate that various methods and metrics are well known for determining a user's web viewing habits.

Additionally, user-profile data may also influence potential search-engine queries. Specified occupations, interest, hobbies, location, age, gender, marital status, or similar data may be used by the advertisement server 212 to select potential search-engine queries.

Any of the above-described traffic information, either singularly or in combination, may be used to select potential search-engine queries. Once selected, the potential search-engine queries are presented in a portion of the web page—for example, in a banner-advertisement or iFrame. Once presented, the user may select a potential search-engine query, initiating a query to the search-engine server 204 for either keywords or multimedia. For example, if the user selects a hyperlink entitled "San Francisco," the search-engine server 204 will inevitably search for web content about San Francisco. In another example, if a user selects a picture of a famous person, the search-engine server 204 may be configured to search for web pages, images, video, or audio about the person. Eventually, the results of a query performed by the search-engine server 204 are returned to the client computing device 202 and displayed by the web browser 212.

Figure 3:
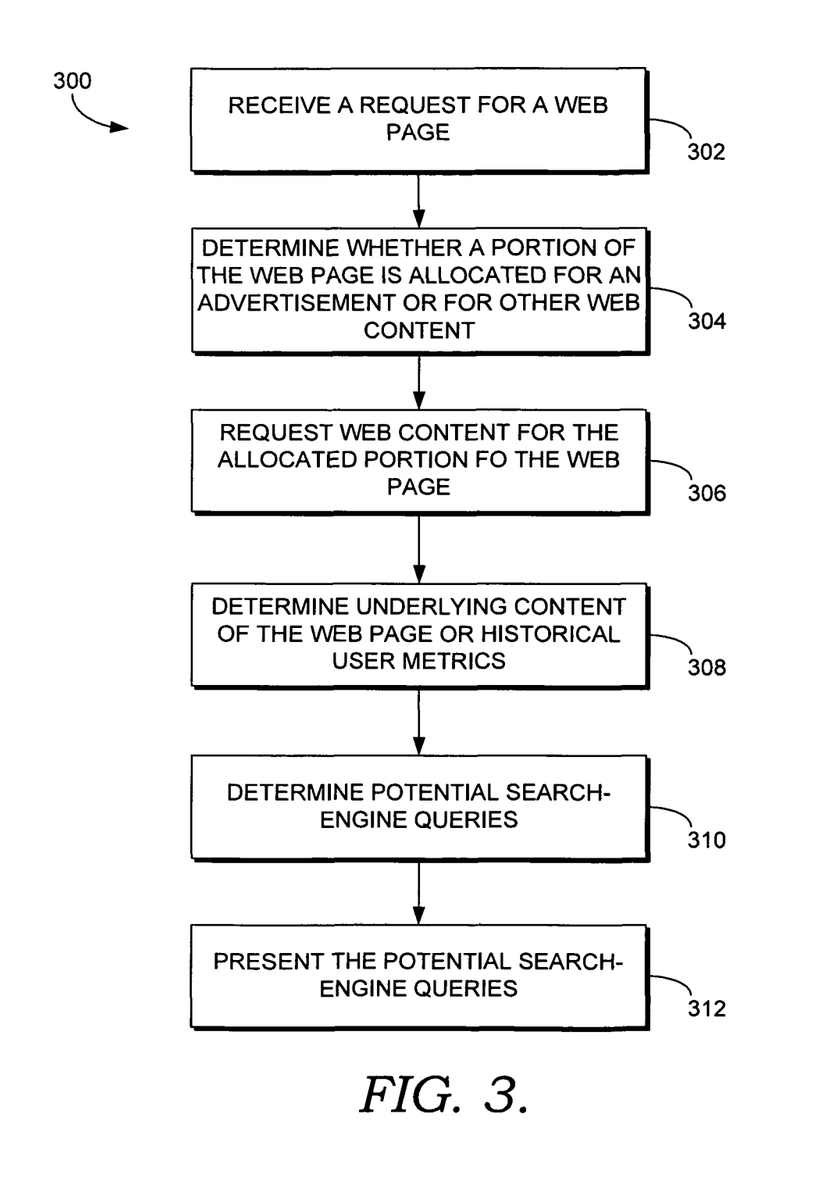
FIG. 3 depicts a flow diagram illustrating a method of determining potential search-engine queries for display in accordance with an embodiment of the present invention.

FIG. 3 depicts a flow diagram 300 illustrating a method of determining potential search-engine queries for display in accordance with an embodiment of the present invention. Initially, a web server receives a request for a web page, as indicated at 302. This may be sent from the client computing device 202 to the web server A 206 or N 208. While rendering the web page, the web server determines whether a portion of the web page is allocated for an advertisement or for other web content (e.g., such as when an iFrame is specified), as indicated at 304. If so, the web server contacts a server and requests web content for the allocated portion of the web page, as indicated at 306. For example, the web server may contact an advertisement server (such as the advertisement server 212).

The contacted server determines the underlying content of the web page or retrieves any of the historical user metrics described herein, as indicated at 308. For example, the underlying content may be retrieved by analyzing SmartTags or other data. Historical user metrics include, for example but without limitation, historical user keywords, traffic information, user-profile data, toolbar information, or similar data. In some embodiments, either the underlying content of the web page or the historical user metrics are used to determine potential search-engine queries to present in the portion of the web page, as indicated at 310. For example, keywords specifying the content or SmarTags may be assigned particular weights and submitted as a query to either a search engine or advertisement server. Once determined, the potential search-engine queries are presented to the user in the portion of the web page, as indicated at 312.

Figure 4:
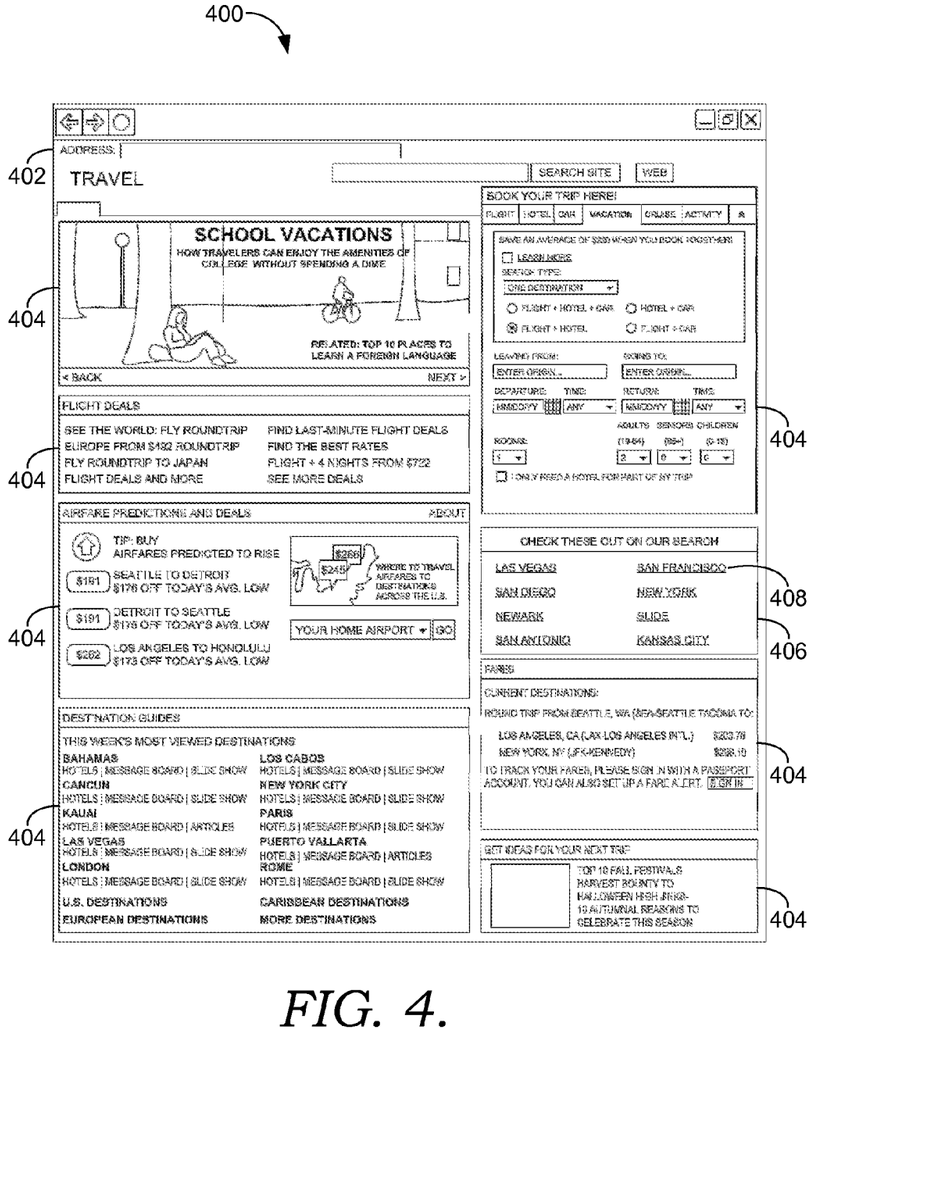
FIG. 4 depicts a graphical user interface (GUI) displaying a web page that includes a portion for potential search-engine queries on a web browser in accordance with an embodiment of the present invention.

FIG. 4 depicts a graphical user interface (GUI) 400 displaying a web page 404 that includes a portion for potential search-engine queries on a web browser in accordance with an embodiment of the present invention. The web page 404 contains content about traveling, as indicated in various frames 404 of the web page. One particular page, however, illustrates eight different potential search-engine queries 408, notably eight different cities. Once a user selects any of the potential search-engine queries 408, a request with the name of the city is sent to a search engine (e.g., the search engine hosted on the search-engine server 204). In one embodiment, the results of the search engine's query of the selected potential search-engine query is displayed to the user. For example, if the user selected San Francisco, a search-engine results page would be returned listing web pages related to San Francisco.

FIG. 4 merely depicts textual keywords that can be searched; however, embodiments described herein are not limited to determining and displaying textual keywords as potential search-engine queries. In an alternative embodiment, the potential search-engine queries 408 may include images of the various cities. Videos or audio may also be displayed as potential search-engine queries 408. Once a displayed image, video, or audio is selected by the user, a request is made for images, videos, or audio, respectively, of the potential search-engine queries 408. One skilled in the art will also recognize that the selection of one form (e.g., an image) of a potential search-engine query 408 may initiate a search for another type (e.g., text or videos).

The present invention has been described in relation to particular embodiments, which are intended in all respects to illustrate rather than restrict. Alternative embodiments will become apparent to those skilled in the art that do not depart from its scope. Many alternative embodiments exist, but are not included because of the nature of this invention. A skilled programmer may develop alternative means for implementing the aforementioned improvements without departing from the scope of the present invention.

It will be understood that certain features and subcombinations of utility may be employed without reference to features and subcombinations and are contemplated within the scope of the claims. Furthermore, the steps performed need not be performed in the order described.

The invention claimed is:

1. A computer-storage device storing computer-executable instructions that, when executed by a computing device, facilitate a method of providing one or more suggested search-engine queries related to content of a web page that is requested, the method comprising:

retrieving the web page in response to a request from a client computing device to provide the web page, wherein the web page is configured to present an advertisement in an advertisement frame;

identifying a suggested search-engine query to be provided together with the web page, wherein identifying the suggested search-engine query includes identifying one or more hyperlinks included on the web page, analyzing historical user metrics, or a combination thereof;

creating a web-page element that includes a hyperlink that, when selected, communicates the suggested search-engine query to a search-engine server, wherein the suggested search-engine query includes a search term derived from the one or more hyperlinks or the historical user metrics;

inserting the web-page element in the advertisement frame instead of the advertisement to syndicate the request to the search-engine server by way of the advertisement frame; and providing to the client computing device the web page, which includes both the web-page element having the hyperlink and the content combined together in a same web page, thereby providing the suggested search-engine query comprised of the search term.

2. The computer-storage device of claim 1, wherein the method further comprises determining that the web page includes one or more inline frames (iFrames).

3. The computer-storage device of claim 1, wherein the method further comprises determining that the web page includes a banner ad or a pop-up advertisement.

4. The computer-storage device of claim 1, wherein the method further comprises determining that the web page includes at least one sponsored-search result.

5. The computer-storage device of claim 1, wherein the method further comprises querying one or more click logs to identify other suggested search-engine queries.

6. The computer-storage device of claim 1, wherein the method further comprises querying a database storing one or more SmartTags associated with one or more web pages.

7. The computer-storage device of claim 1, wherein the method further comprises analyzing historical user metrics to identify other suggested search-engine queries.

8. The computer-storage device of claim 1, wherein historical user metrics include at least one of a plurality of historical user keywords, traffic information, user-profile data, and toolbar information.

9. The computer-storage device of claim 1, wherein other suggested search-engine queries are determined by analyzing one or more weights assigned to one or more SmartTags.

10. A method for providing to a client computing device a suggested search-engine query related to content of a web page, the method comprising:
  receiving a request to provide the web page to the client computing device;
  determining that the web page includes a frame configured to present ancillary content that is secondary to the content of the web page,
  identifying a suggested search-engine query to be provided together with the web page, wherein identifying the suggested search-engine query includes identifying one or more hyperlinks included in the web page, querying a set of historically requested web information to identify a subject matter, or a combination thereof;
  creating a web-page element that includes a hyperlink that, when selected, communicates the suggested search-engine query to a search-engine server, wherein the suggested search-engine query comprises a search term derived from the one or more hyperlinks or the subject matter;
  transforming the frame to include the web-page element instead of the ancillary content to add to the webpage the request to the search-engine server; and
  providing to the client computing device the web page, which includes both the web-page element having the hyperlink and the content combined together in a same webpage, thereby providing the suggested search-engine query comprising the search term.

11. The method of claim 10, wherein the ancillary content comprises a web advertisement 12. The method of claim 10, wherein the frame comprises one or more inline frames (iFrames).

13. The method of claim 10, wherein the set of historically requested web information includes user keywords, traffic information, toolbar information, or a combination thereof.

14. A computer-storage device storing computer-executable instructions that, when executed by a computing device, facilitate a method of providing one or more suggested search-engine queries related to content of a web page that is requested, the method comprising:
  retrieving the web page in response to a request from a client computing device to provide the web page,
    wherein the web page is configured to present an advertisement in an advertisement frame, and
    wherein the request is associated with a user having a user profile;
  identifying a suggested search-engine query to be provided together with the web page, wherein identifying the suggested search-engine query includes identifying one or more hyperlinks included in the web page, analyzing historical user metrics, or a combination thereof;
  creating a web-page element that includes a hyperlink that, when selected, communicates the suggested search-engine query to a search-engine server, wherein the suggested search-engine query comprises a search term derived from the one or more hyperlinks or the historical user metrics;
  inserting the web-page element in the advertisement frame instead of the advertisement to syndicate the request to the search-engine server by way of the advertisement frame; and
  providing to the client computing device the web page, which includes both the web-page element having the hyperlink and the content combined together in a same web page, thereby providing the suggested search-engine query comprised of the search term.

* * * * *